United States Patent [19]

Zabrocki et al.

[11] Patent Number: 4,600,747
[45] Date of Patent: Jul. 15, 1986

[54] ABS-MOULDING COMPOSITIONS WITH IMPROVED FLAME RESISTANCE

[75] Inventors: Karl Zabrocki, Buettgen; Christian Lindner, Cologne; Friedmann Müller, Neuss; Joachim Döring, Cologne, all of Fed. Rep. of Germany

[73] Assignee: Bayer Aktiengesellschaft, Leverkusen-Bayerwerk, Fed. Rep. of Germany

[21] Appl. No.: 724,753

[22] Filed: Apr. 18, 1985

Related U.S. Application Data

[63] Continuation-in-part of Ser. No. 647,452, Sep. 5, 1984, abandoned.

[30] Foreign Application Priority Data

Sep. 17, 1983 [DE] Fed. Rep. of Germany ....... 3333722

[51] Int. Cl.[4] .................. C08L 51/04; C08L 55/02
[52] U.S. Cl. ........................ 525/83; 525/79; 525/74; 525/75; 525/76; 525/80; 525/81; 525/84; 525/300
[58] Field of Search ............... 525/83, 300, 81, 84, 525/73-76, 80

[56] References Cited

FOREIGN PATENT DOCUMENTS 3149797 6/1983 Fed. Rep. of Germany ...... 525/300

*Primary Examiner*—Carman J. Seccuro
*Attorney, Agent, or Firm*—Connolly and Hutz

[57] ABSTRACT

ABS-moulding compositions consisting of a thermoplastic copolymer and a graft polymer with rubber-like graft base exhibit an improved flame resistance if the total mixture contains a compound corresponding to the formulae

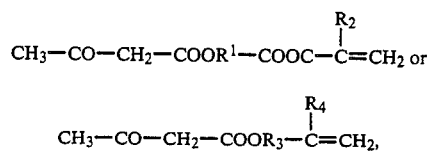

polymerized into one or both components, wherein
$R_1$ represents $C_2$–$C_6$-alkylene,
$R_2$ represents hydrogen or methyl,
$R_3$ represents a direct bond or $C_1$–$C_4$-alkylene, and
$R_4$ represents hydrogen, methyl or $CH_2$—OO—C—$CH_2$—CO—$CH_3$.

5 Claims, No Drawings

ABS-MOULDING COMPOSITIONS WITH IMPROVED FLAME RESISTANCE

This application is a continuation-in-part of application Ser. No. 647,452 filed Sept. 5, 1984, now abandoned.

This invention relates to ABS-moulding compositions based on specific copolymers and graft polymers of olefinically unsaturated monomers and copolymerisable acetylacetate derivatives, the flame resistance of which is improved relative to known ABS-materials.

ABS-moulding compositions are two-phase plastics materials comprising

I. one or more thermoplastic copolymers of styrene and acrylonitrile, in which the styrene can be completely or partially replaced by other monomers, which forms the external phase, and II. at least one graft polymer with a rubber-like graft base which forms the disperse phase.

ABS-moulding compositions are starting materials for the production of moulded articles.

A disadvantage of these materials is their unsatisfactory flame resistance which greatly restricts their use for fire-endangered, in particular thermally stressed articles, for example housings for record players and televisions. Inorganic oxides, for example $Sb_2O_3$, and/or halogen-containing additives, for example octabromodiphenylether, can be used to increase the flame resistance of ABS-materials. However, these additives are effective only in contents of between 10 and 30% by weight, which would greatly impair the mechanical strength of the article.

It has now been found that the inflammability of ABS-moulding compositions can be reduced considerably by copolymerisation with specific monomers. The addition of flame retardant additives can be omitted completely or in part by this method.

The present invention thus provides ABS-moulding compositions which comprise

I. from 90 to 30% by weight of one or more thermoplastic copolymers of (Ia) from 50 to 80% by weight of styrene, α-methylstyrene, styrenes alkylated in the nucleus, halogen styrenes, maleic acid anhydride, N-substituted or unsubstituted maleic imide, methyl methacrylate, indene or mixtures of two or more of these monomers, (Ib) from 35 to 15% by weight of acrylonitrile and/or methacrylontrile, and (Ic) from 20 to 0.2% by weight of at least one additional copolymerisable compound, II. from 10 to 70% by weight of one or more graft polymer obtainable by polymerisation of the monomers mentioned under Ia and/or Ib and/or Ic in the presence of at least one rubber polymer, the percentages by weight in I and II being based on the sum of I and II, and III. Optionally conventional additives and are characterised in that the additional copolymerisable compound Ic corresponds to the formulae

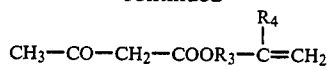

wherein $R_1$ represents $C_2$-$C_6$-alkylene, $R_2$ represents hydrogen or methyl, $R_3$ represents a direct bond or $C_1$-$C_4$-alkylene and $R_4$ represents hydrogen, methyl or $CH_2$—OO—C—$CH_3$—CO—$CH_3$ and the total quantity of compound (Ic) does not exceed 25% by weight, based on the moulding composition.

Preferred monomers Ia include styrene, α methylstyrene and p-methylstyrene.

The monomers (Ic) are known and are prepared, for example, by reaction of corresponding OH-compounds with diketene or by re-esterification of acetylacetates with corresponding OH-compounds.

Preferred compounds (Ic) include reaction products of diketene with OH-containing acrylic esters, for example with hydroxyethyl acrylate, hydroxypropyl acrylate, hydroxyethyl methacrylate and hydroxypropyl methacrylate.

From 60 to 75% by weight of (Ia), from 32 to 20% by weight of (Ib) and from 15 to 3% by weight of (Ic) are preferably copolymerised.

Higher contents of (Ic) than 25% by weight generally lead to a drop in the toughness of the product while lower contents than 0.2% are ineffective for flame resistance.

The particular rubber used to produce the graft polymer of this invention composition is not important and has no particular criticality. Any elastomic material is suitable for the rubber used to produce the graft polymer. In this context, any polymer having a second order transition temperature not higher than 0° C. as determined by ASTM Test D-746-52T is considered to be a rubber. Those skilled in the art are aware of a vast number of particular rubber materials useful in producing graft polymers and any of those is suitable for producing the graft polymer of this invention composition. Accordingly, various rubber materials onto which the above-mentioned monomers can be grafted during the polymerization in the presence thereof are utilizable as the substrate of the graft copolymer including conjugated 1,3-diene rubbers, ethylene-propylenediene terpolymer rubbers, acrylate-diene interpolymer rubbers, and mixtures thereof. Although saturated rubbers may be grafted, it has been found desirable to include at least a small amount (at least 1.0 percent by weight) of a diene monomer component such as butadiene or hexadiene to facilitate grafting in ethylene/propylene and acrylate rubbers. This diene monomer component will normally comprise 1 to 20 percent by weight and preferably 2 to 8 percent by weight of the ethylene/propylene/diene terpolymer or acrylate copolymer rubber.

The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D-746-52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the arethylstyresnes, p-tert-butylstyrene, etc.; an alpha-alkylstyrene, such as alpha-methylstyrene, alphaethylstyrene, alpha-methyl-p-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber-forming monomer or monomers, cross-linking may present problems in dissolving the rubber in the monomers for the graft polymerization reaction. In addition, excessive cross-linking can result in loss of the rubbery characteristics. The cross-linking agent can be any of the agents conventionally employed for cross-linking diene rubbers, e.g., divinylbenzene, diallyl maleate, diallyl fumarate, diallyl adipate, allyl acrylate, allyl methacrylate diacrylates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

Suitable rubber polymers include, for example, polybutadiene, SBR, NBR and polybutylacrylate. Polybutadiene and SBR are preferred.

The ratio by weight of the polymerized monomers to the rubber in the graft polymer II is generally 95:5 to 10:90, preferably 60:40 to 30:70.

Styrene and acrylonitrile, in particular, are used as graft monomers, preferably in a ratio by weight of 60:40 to 80:20.

Any conventional polymerisation methods such as bulk polymerisation, solution polymerisation or emulsion polymerisation can be adopted for the production of the resin polymers I and also for the graft polymers II (Ullmanns Encyclopadie der technischen Chemie, Volume 19, page 277 to 95; Verlag Chemie, Weinheim 1980).

Bulk polymerisation and emulsion polymerisation are preferred.

The resins I are generally readily soluble in organic solvents and generally have average molecular weights of $6.10^3$ to $10^6$, preferably $10^4$ to $2.10^5$ (number average $M_n$).

The graft polymers II are only soluable in part. They preferably have grafting degrees G, according to the definition given in DE-AS 2,420,358, of 0.3 to 1.0.

The mixing of the resin polymers I with the graft polymers II can take place either in the "wet" state, i.e. as solution, suspension or emulsion, or in the "dry" state i.e. as powder, granulate or melt, thorough mixing which is normal for thermoplastics taking place in the latter case in kneaders, screw machines, roller stools or other machines conventional in the processing of thermoplastics.

Conventional additives such as stabilisers, lubricants, anti-static agents, fillers and pigments can be added.

The moulding compositions are processed, for example, by granulation, injection moulding, extrusion, calendering, pressure or blasting.

The ABS moulding compositions according to the invention are distinguished by considerably improved flame resistance while maintaining their good mechanical properties and good thermal deformation resistance.

Preparation of the resin polymers

After careful nitrogen flushing at 65° C., a solution of d g of $K_sS_2O_8$ in water as well as 150 g of the monomer mixture were introduced into a starting mixture of a kg of water and b g of the emulsifier c. The remainder of the monomer mixture as well as an acqueous solution of e g of emulsifier c were measured in over 4 hours after initiation of polymerisation. The total monomer mixture comprised 3 kg, the data referring to percent by weight. The mixture was then stirred for a further 4 hours at 65 to 70° C.

The compound corresponding to the formula

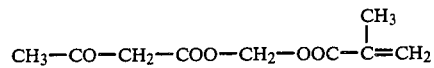

was introduced as component (Ic).

TABLE 1

| Resin polymer | a | b | c | d | e | Styrene | Methyl-styrene | Acrylo-nitrile | Ic | tert.-* DDM (g) |
|---|---|---|---|---|---|---|---|---|---|---|
| A | 2.85 | 2.4 | Resin soap introduced under alkaline conditions | 9 | 57 | 72 | — | 28 | — | 12 |
| B | 3.73 | 3.0 | Alkyl-sulphonate | 9 | 72 | — | 69 | 31 | — | 15.6 |
| C | | | ← as A → | | | 62 | — | 28 | 10 | 12 |
| D | | | ← as B → | | | — | 59 | 31 | 10 | 15.6 |

*tertiary dodecylmercaptan as regulator.

Preparation of the graft polymer

In a preliminary step there was introduced a polybutadiene latex containing 1.5 kg of solids and having an average particle diameter of 0.4, μm, diluted to 20% by weight solids, the mixture was heated to 65° C. with N₂-flushing, 15 g of $k_2S_2O_8$ dissolved in water were added and 1.5 kg of monomer mixture as well as an alkaline adjusted solution of 60 g of alkyl sulphonate emulsifier were then added over 4 hours. The mixture was allowed to react for a further 4 hours at 65° to 70° C. The component (Ic) was the same as for preparation of the resin.

TABLE 2

| Graft polymer | Composition of the monomer mixture (g) | | |
|---|---|---|---|
| | Styrene | Acrylonitrile | Ic |
| E | 1080 | 420 | — |
| F | 972 | 378 | 150 |
| G | 918 | 357 | 225 |

After addition of a stabiliser, the resins and graft polymers were precipitated separately by addition of salts, washed, dried and mixed in a kneader according to the following forumulation:
2 kg of graft polymer
3 kg of resin polymer
0.1 kg of ethylenediamine bis-stearoylamide lubricant
0.01 kg of silicone oil.

The materials were injection moulded into test bodies after rolling and their rate of combustion was measured in accordance with VDE 0860 HF and their thermal deformation resistance was measured in accordance with Vicat B.

The comparison tests and Examples are compiled in Table 3.

TABLE 3

| | Resin | Graft Polymer | (mm/min) | Combustion Rate | Vicat B (°C.) |
|---|---|---|---|---|---|
| Example 1 | D | E | 44 | | 102 |
| Example 2 | C | F | 38 | | 102 |
| Example 3 | C | G | 45 | | 98 |
| Comparison Example 1 | A | E | 50 | | 99 |
| Comparison Example 2 | B | E | 47 | | 95 |

What is claimed is:

1. In an improved ABS-moulding composition comprising
I. from 90 to 30% by weight of one or more thermoplastic copolymers comprising
(Ia) from 50 to 80% by weight of styrene, α-methylstyrene, nucleus-alkylated styrene, halogen styrene, maleic acid anhydride, N-substituted or unsubstituted maleic imide, methyl methacrylate, indene or a mixture of two or more of these monomers,
(Ib) from 35 to 15% by weight of acrylonitrile, methacrylonitrile or mixtures thereof, and
(Ic) from 20 to 0.2% by weight of at least one additional copolymerizable compound, and
II. from 10 to 70% by weight of at least one graft polymer, obtainable by polymerization of one or more monomers from one or more of the groups (Ia), (Ib), (Ic), in the presence of at least one diene containing rubber polymer, with the percentages by weight of I and II being based on the sum of I and II,
the improvement comprises said additional copolymerizable compound (Ic) is of the formula

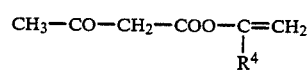

wherein
$R_1$ represents a $C_2$–$C_6$-alkylene,
$R_2$ represents hydrogen or methyl,
$R_3$ represents a $C_1$–$C_4$-alkylene, and
$R_4$ represents hydrogen, methyl or $CH_2$—OOC—$CH_2$—CO—$CH_3$ and the total quantity of (Ic) not exceeding 25% by weight, based on the moulding composition.

2. An ABS-moulding composition according to claim 1, wherein the thermoplastic copolymer I comprises 60 to 75% by weight of (Ia), 32 to 20% by weight of (Ib) and 15 to 3% by weight of (Ic).

3. An ABS-moulding composition according to claim 1, wherein (Ic) is a reaction product of diketene and hydroxyethyl (meth) acrylate or hydroxypropyl (meth)-acrylate.

4. An ABS-moulding composition according to claim 2, wherein (Ic) is a reaction product of diketene and hydroxyethyl (meth) acrylate or hydroxypropyl (meth)-acrylate.

5. Moulded articles produced from an ABS moulding composition according to claim 1.

* * * * *